United States Patent [19]

Nakashima et al.

[11] Patent Number: 4,628,778

[45] Date of Patent: Dec. 16, 1986

[54] INDUSTRIAL ROBOT

[75] Inventors: Seiichiro Nakashima, Hino; Shigemi Inagaki, Kokubunji; Susumu Ito, Hino; Yasuo Naito, Hino; Kazuhisa Otsuka, Hino, all of Japan

[73] Assignee: Fanuc Ltd, Tokyo, Japan

[21] Appl. No.: 833,533

[22] Filed: Feb. 12, 1986

Related U.S. Application Data

[63] Continuation of Ser. No. 534,771, Sep. 22, 1983, abandoned.

[30] Foreign Application Priority Data

Sep. 22, 1982 [JP] Japan ................... 57-165550

[51] Int. Cl.[4] .................................. B23B 15/00
[52] U.S. Cl. ...................... 82/2.5; 414/225; 414/732; 414/738; 414/751; 901/14; 901/19
[58] Field of Search .............. 82/2.5, 2.7; 414/225, 414/589, 590, 730, 732, 736, 738, 751, 753, 901, 14–18, 19, 27–29, 37, 39

[56] References Cited

U.S. PATENT DOCUMENTS

| | | | |
|---|---|---|---|
| 4,042,122 | 8/1977 | Espy et al. | 901/29 |
| 4,161,849 | 7/1979 | Voumard et al. | 82/2.5 |
| 4,289,441 | 9/1981 | Inaba et al. | 414/751 |
| 4,302,144 | 11/1981 | Hallquist | 82/2.5 |
| 4,312,618 | 1/1982 | Greene | 82/2.7 |
| 4,317,394 | 3/1982 | Link et al. | 82/2.5 |
| 4,352,620 | 10/1982 | Inaba et al. | 414/225 |
| 4,439,090 | 3/1984 | Schaefer | 414/736 |
| 4,458,566 | 7/1984 | Tauima | 82/2.5 |

FOREIGN PATENT DOCUMENTS

| | | |
|---|---|---|
| 0022332 | 1/1981 | European Pat. Off. . |
| 0022331 | 1/1981 | European Pat. Off. . |
| 0033689 | 8/1981 | European Pat. Off. . |
| 0088644 | 9/1983 | European Pat. Off. . |
| 2444124 | 4/1976 | Fed. Rep. of Germany . |
| 2518824 | 11/1976 | Fed. Rep. of Germany . |
| 2213212 | 8/1974 | France . |
| 47-025858 | 10/1972 | Japan . |
| 82/01153 | 4/1982 | PCT Int'l Appl. . |
| 1455782 | 11/1976 | United Kingdom . |

Primary Examiner—Francis S. Husar
Assistant Examiner—Jerry Kearns
Attorney, Agent, or Firm—Staas & Halsey

[57] ABSTRACT

A compact industrial robot for mounting on a lathe includes a traveling body transported along an axis (Z axis) parallel to the axis of a spindle provided on a lathe, a column provided on the traveling body for extending and retracting in a vertical direction (Y axis), a first rotating mechanism provided on the column for rotation about an axis (C axis) parallel to the spindle axis, and a second rotating mechanism provided on the rotary shaft of the first rotating mechanism and having a hand. The hand, having a double-hand configuration, is swung by the first rotating mechanism in a plane orthogonal to the spindle axis, and is swiveled by the second rotating mechanism about the longitudinal axis (α axis) of the second rotating mechanism.

7 Claims, 8 Drawing Figures

INDUSTRIAL ROBOT

This is a continuation of copending application Ser. No. 534,771 filed on Sept. 22, 1983 and now abandoned.

BACKGROUND OF THE INVENTION

This invention relates to an industrial robot for mounting on a lathe.

It is now common for industrial robots to be used to effect the exchange of tools and workpieces in machine tools automatically. To service a lathe, which is one type of machine tool, the original practice was to provide a single industrial robot and have the robot serve a plurality of the lathes. In order to raise the efficiency of the manufacturing operation, however, it is now common practice to provide an industrial robot for each lathe in the factory and have each robot service solely its mate. One problem with the conventional industrial robot, however, is the large area required for installation. Another is that a large number of articulations or degrees of freedom are needed in order to perform a full range of services for the lathe. Such a robot has a complex construction and is high in cost.

SUMMARY OF THE INVENTION

The object of the present invention is to provide an industrial robot adapted for mounting on a lathe, which robot is capable of performing all the necessary motions with a small number of articulations, and which requires but a small area for installation.

According to the present invention, the foregoing object is attained by providing an industrial robot for mounting on a lathe and having four controlled axes, namely, a Z axis parallel to the axis of the spindle of the lathe, a Y axis orthogonal to the Z axis, a C axis orthogonal to the Y axis and parallel to the axis of the spindle, and an $\alpha$ axis orthogonal to the C axis. The industrial robot has a hand disposed on the $\alpha$ axis.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1 and 2 are schematic diagrams illustrating the construction of an industrial robot of the present invention, in which FIG. 1 shows the robot hand retracted into a lathe, and FIG. 2 shows the robot in operation;

FIGS. 7(a) and 7(b) are schematic diagrams showing the internal mechanism of the robot hand, in which FIGS. 7(A) and 7(B) illustrate first and second embodiments, respectively.

DESCRIPTION OF THE PREFERRED EMBODIMENT

Figure 1:
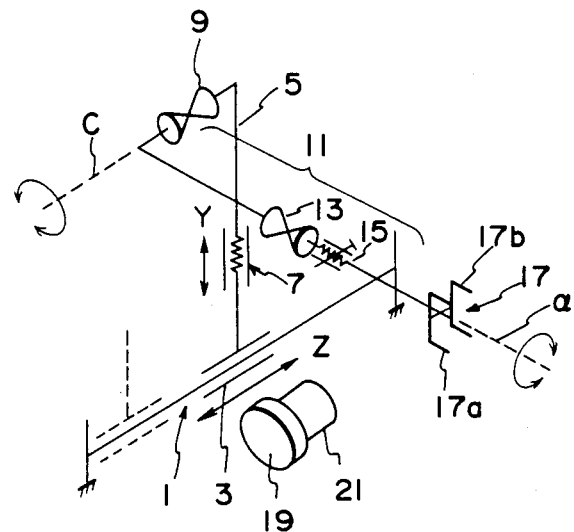

With reference to FIG. 1, a moving mechanism 1 has both ends thereof secured to the sides of a lathe, not shown. The moving mechanism 1 is provided with a traveling body 3 that travels longitudinally with respect to the moving mechanism, i.e., along the Z axis, which is parallel to the axis of the lathe spindle. A column 5 extending vertically, i.e., along the Y axis, is secured to the traveling body 3. The column 5 is provided at a point along its length with a member 7 for extending and retracting the column 5 along the Y axis. A first rotating mechanism 9 extending along the C axis, which is parallel to the spindle axis, is attached at one end to the distal end of the column 5. The other end of the first rotating mechanism is provided with an arm 11, which extends at right angles to the C axis, [i.e., along the $\alpha$ axis]. The arm 11 is provided at a point along its length with a second rotating mechanism 13, and with a semi-fixed extending and retracting member 15 disposed between the second rotating mechanism 13 and a hand 17. The hand 17, which is of the double hand type having two pairs of fingers or grippers 17a, 17b, is provided at the distal end of the arm 11. The hand 17 is swiveled about the $\alpha$ axis by the second rotating mechanism 13. Numeral 19 denotes the chuck of the lathe, and numeral 21 represents a machined workpiece already loaded into the chuck.

Figure 2:
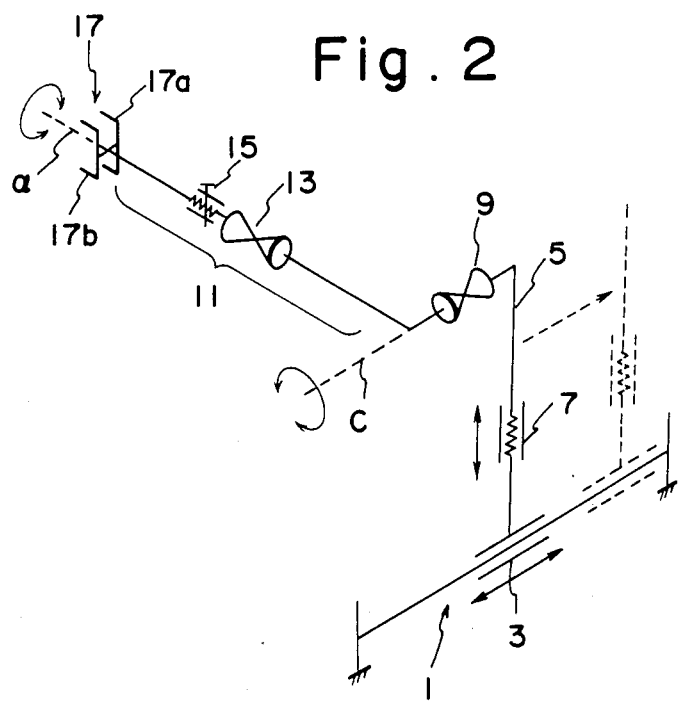

The industrial robot described above operates in the following manner. In FIG. 1, the hand 17 is shown to be retracted within the lathe. Also, the pair of fingers 17b is grasping an unmachined workpiece, which is not shown. Starting from the state illustrated in FIG. 1, the traveling body 3 is transported along the Z axis to the position indicated by the dashed lines, thereby bringing the fingers 17a to the location of the chuck 19, where the fingers 17a are then closed to grasp the machined workpiece 21 held by the chuck. When this has been accomplished, the chuck 19 is opened to release the workpiece, which is being grasped firmly by the fingers 17a. The traveling body 3 now is backed up slightly, after which the second rotating mechanism 13 is rotated to swivel the hand through an angle of 180 degrees. This brings the pair of fingers 17b to the position confronting the chuck 19, and moves the fingers 17a to the side facing away from the chuck. Next, the traveling body 3 is moved back toward the chuck, so that the unmachined workpiece being held by the fingers 17b will be inserted into the awaiting chuck 19, which is then closed to grasp the workpiece. Now the fingers 17b are opened to release their hold on the workpiece, the traveling body 3 is transported back to the position shown in FIG. 1, and the first rotating mechanism 9 is actuated to swing the arm 11 to the position shown in FIG. 2. In this state the arm 11 and the hand 17 at the distal end of the arm will be projecting outwardly from the lathe. This is followed by actuating the traveling body 3 to transport the column 5 toward the position indicated by the dashed lines in FIG. 2, during which time the second rotating mechanism 13 is rotated to swivel the hand 17 is such a manner that the fingers 17a, which are grasping the machined workpiece just removed from the chuck, are faced downward. Thereafter, the extending and retracting member 15 is retracted to bring the hand 17 to a position just above that part of a workpiece feeder, not shown, on which machined workpieces are placed. The fingers 17a are then opened to deposit the machined workpiece on the feeder. The hand 17 is now raised slightly by the extending and retracting member 7, and the traveling body 3 is actuated to transport the hand 17 to a position where the fingers 17a will be situated above an unmachined workpiece, which the finger is then made to graps. The steps described above are then repeated in reverse order to carry the unmachined workpiece to the chuck 19, where it will eventually be exchanged for the workpiece being held by the chuck.

Figure 3:
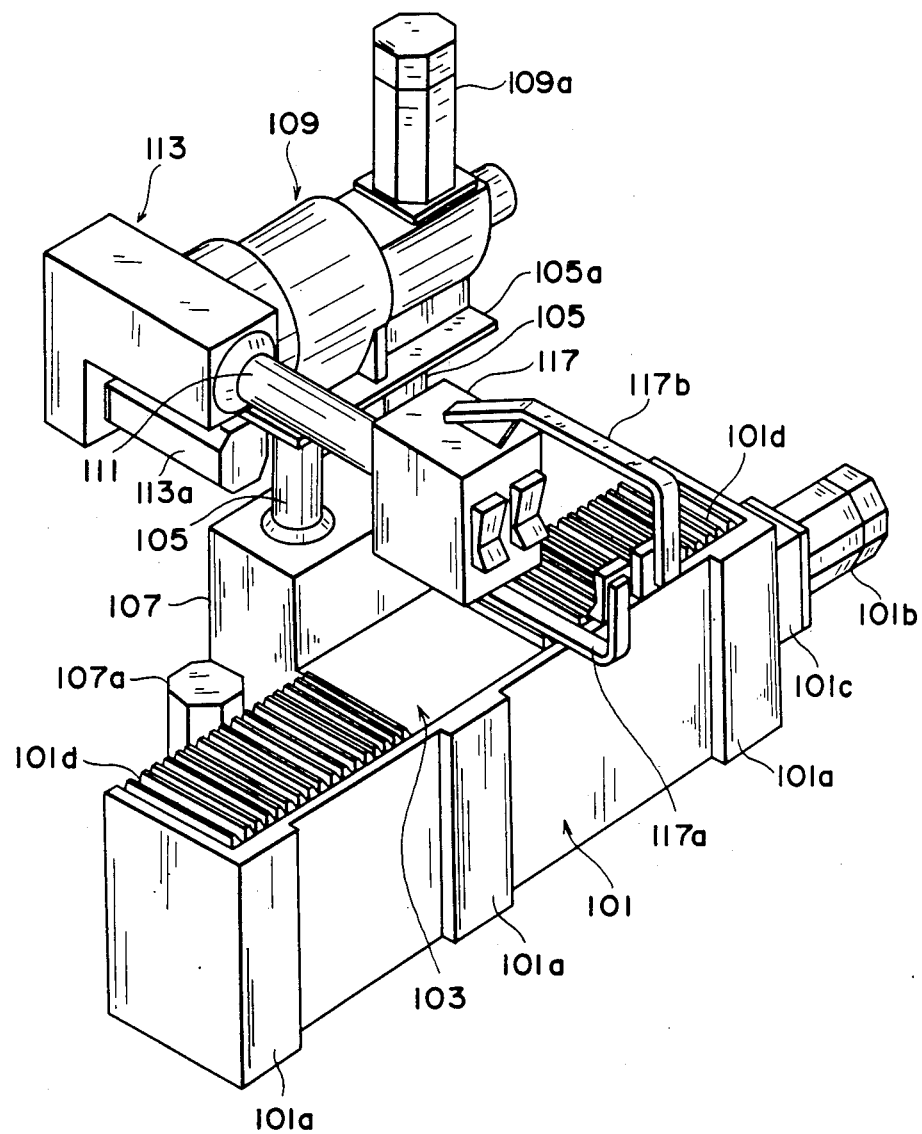
FIG. 3 is a perspective view showing the external appearance of the industrial robot.
Figure 4:
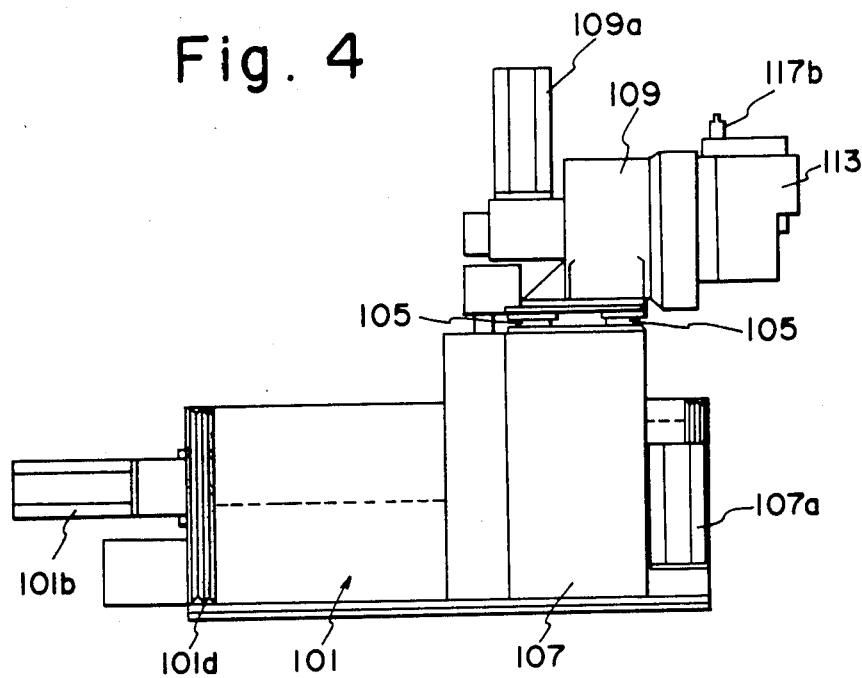
FIG. 4 is a front view of the industrial robot.
Figure 5:
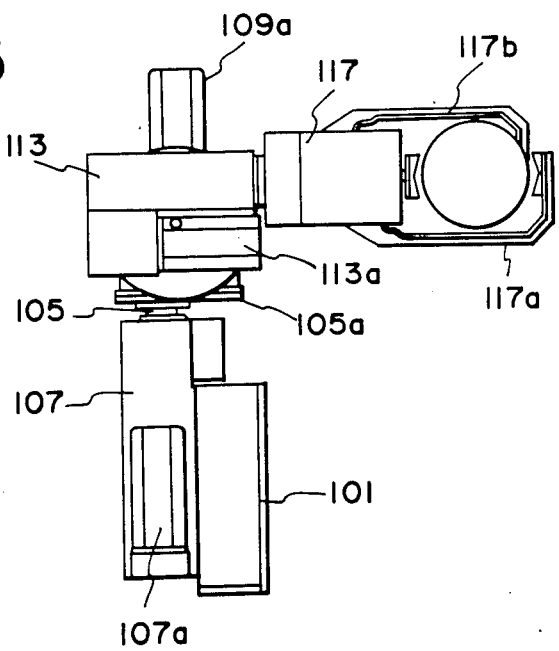
FIG. 5 is a side view of the industrial robot.

The perspective view of FIG. 3 illustrates the actual external appearance of the industrial robot described above. In FIG. 3, numeral 101 denotes a moving mechanism, which corresponds to the moving mechanism 1 mentioned above. The side face of the moving mechanism 101 is provided with three mounting portions 101a, each of which is fixedly secured to the side wall of a lathe, not shown. A motor 101b for movement along the Z axis is provided at one end of the moving mechanism 101. Numeral 101c denotes a reduction mechanism. The moving mechanism 101 is further provided with a traveling body 103 that is capable of moving longitudinally with respect to the moving mechanism, the interior of which is covered by a bellows 101d. Attached to the side of the traveling body 103 is an extending and retracting member 107 for raising and lowering a pair of columns 105. The extending and retracting member 107 is driven by a motor 107a. A mounting plate 105a is provided across the upper ends of the columns 105. The upper side of the mounting plate 105a supports a first rotating mechanism 109 set thereon. A second rotating mechanism 113 is provided on one end of the first rotating mechanism 109, and is swung about the C axis by a rotary shaft (not shown) provided on the first rotating mechanism 109. The second rotating mechanism 113 is driven by a motor 109a and has an arm 111, which is swiveled about the α axis by a motor 113a provided on the second rotating mechanism 113. Further, the second rotating mechanism 113 has an enclosed, semi-fixed extending and retracting member for transporting the arm 111 along the α axis so that the pairs of robot fingers 117a, 117b, described below, may be positioned with respect to the chuck of the lathe. It should be noted that this extending and retracting member cannot be used while the robot is performing a motion. At the distal end of the arm 111 there is secured a hand 117 having two fingers 117a and 117b. FIGS. 4 and 5 show the industrial robot of the invention in front and side elevation, respectively.

Figure 6:
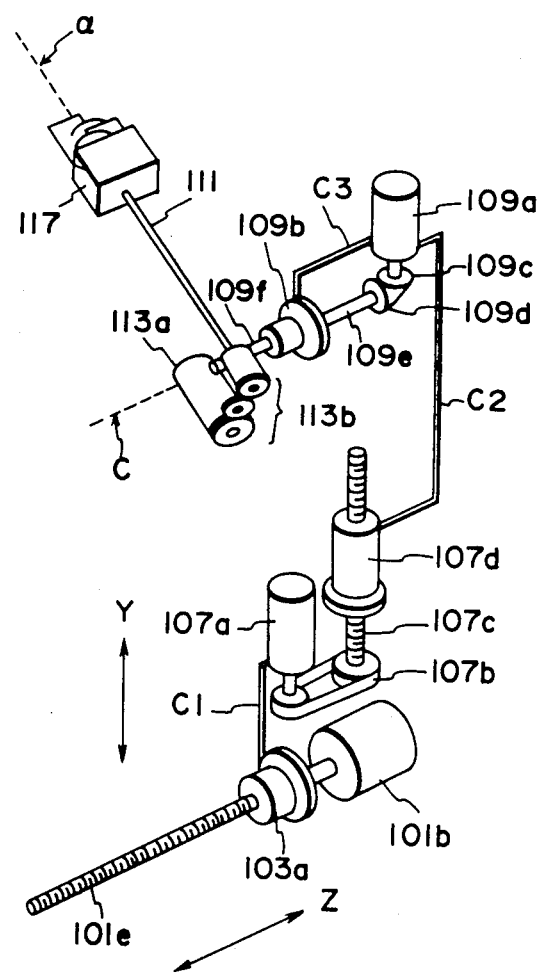
FIG. 6 is a perspective view showing the internal mechanism of the industrial robot.

The operating mechanism of the industrial robot is illustrated schematically in FIG. 6. Portions similar to those shown in FIG. 3 are designated by like reference characters. Numeral 101e denotes a screw rod extending longitudinally from one end of the moving mechanism 101 to the other and rotated by the motor 101b. Numeral 103a denotes a ball nut threadedly engaging the screw rod 101e and provided on the traveling body 103. When the motor 101b is rotated, the screw rod 101e rotates to transport the ball nut 103a along the screw rod 101e, whereby the traveling body 103 is moved along the Z axis. A connecting member C1 connects the traveling body 103 and the extending and retracting member 107. The rotative force developed by the motor 107a, which constitutes the extending and retracting member 107, is transmitted by a timing belt 107b to a screw rod 107c provided along the Y axis. A ball nut 107d threadedly engages the screw rod 107c which, when rotated by the motor 107a through the belt 107b, causes the columns 105 (FIG. 3), which are connected to the ball nut 107d, to be moved along the Y axis, namely in the vertical direction. C2 denotes a connecting member for connecting the columns 105 to the motor 109a, which constitutes the first rotating mechanism 109. The rotative force developed by the motor 109a is transmitted to a rotary shaft 109e through bevel gears 109c and 109d. The rotation of the rotary shaft 109e is transmitted to a rotary shaft 109f through a reduction mechanism 109b provided at one end of the rotary shaft 109f. The motor 113a, which constitutes the second rotating mechanism 113, is secured to the other end of the rotary shaft 109f. The rotary shaft of the motor 113a is orthogonal to the axis of the lathe spindle, i.e., to the C axis, which lies parallel to the Z axis. The rotative force developed by the motor 113a is transmitted to the arm 111 by a set of three gears 113b constituting the second rotating mechanism 113. The arm 111 is semi-fixedly secured to the endmost of the gears 113b by a locking mechanism, which is not shown, thereby forming an extending and retracting member. When the locking mechanism is released, the arm 111 can be moved longitudinally. The hand 117 is attached to the distal end of the arm 111.

Figure 7:
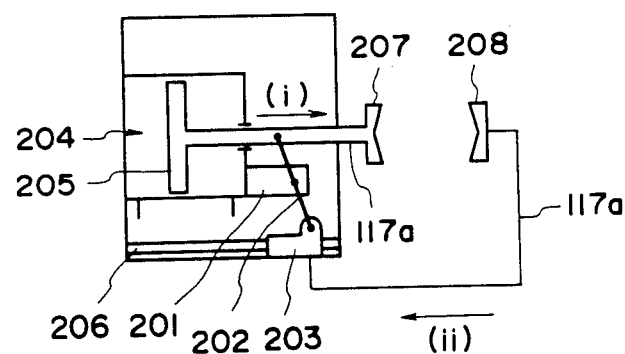
Figure 7:
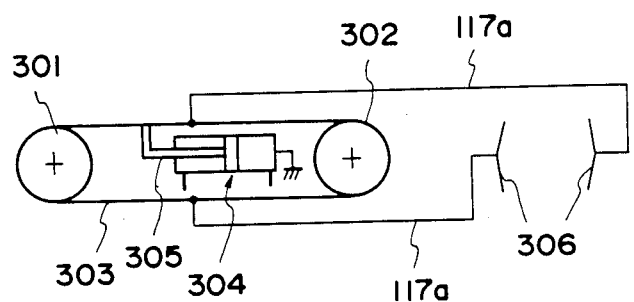

FIGS. 7(A) and 7(B) are schematic views illustrating first and second embodiments of the internal mechanism of the hand 117. In FIG. 7(A), numeral 201 denotes a stationary projection provided on the hand 117 having an end portion that supports a lever 202 at the central portion thereof. The hand 117 is provided with a double-acting cylinder 204 of single rod type, having a single rod 205, and with a stationary shaft 206 that is parallel to the rod 205, the stationary projection 201 being located between the rod 205 and shaft 206. The shaft 206 is provided with a sliding member 203 axially supporting the lever 202 at one end thereof. The other end of the lever 202 is axially supported by the rod 205. The end of the rod 205 that projects from the cylinder 204 serves as one of the fingers 117a, the working end of which is provided with a gripping pad 207. The other of the fingers 117a is connected to the sliding member 203 and similarly has a gripping pad 208 provided on its working end.

When compressed air is introduced into the double-acting cylinder 204 to drive the rod 205 in the direction of the arrow (i), the gripping pad 207 of the finger 117a at the end of the rod 205 is transported in the same direction. At the same time, the rod 205 moves the sliding member 203 in the direction of the arrow (ii) via the lever 202, causing the gripping pad 208 on the other finger 117a to move in the same direction. As a result, the gripping pads 207 and 208 are moved toward each other to grasp a workpiece. Introducing compressed air into the other side of the cylinder 204 will reverse the foregoing operation, causing the gripping pads 207 and 208 to separate from each other and release the workpiece.

In the second embodiment of FIG. 7(B), numerals 301 and 302 denote gears axially supported by the hand 117. Extending between and engaging with the gears 301 and 302 is an endless chain 303. One of the fingers 117a is affixed to the upper segment of the chain 303, and the other is affixed to the lower segment thereof. Numeral 304 denotes a double-acting cylinder having a single rod 305 connected to the chain 303. When air is introduced into the cylinder 304 from one side thereof, the rod 305 is moved to drive the chain. This in turn will move the fingers 117a, each of which has a gripping pad 306 provided at the end thereof, whereby the gripping pads are moved toward or away from each other to grasp or release a workpiece, respectively, depending upon the direction in which the rod 305 is driven by the cylinder 304.

It should be noted that the structure of the hand is not limited to that of the illustrated embodiments. Other known hand configurations may be adopted to move the fingers of the hand.

In the industrial robot of the present invention, lines for conveying a hydraulic fluid or electric current are incorporated entirely within the columns and arm of the robot, and therefore will not impede the motion of the robot during an activity.

In the illustrated embodiments, the moving mechanism 101 is of a type that is mounted directly on the side of the lathe. However, an arrangement is possible wherein the moving mechanism 101 is provided with a mounting member, which is then affixed to the floor near the lathe to locate the robot near the machine tool.

In accordance with the present invention as described and illustrated hereinabove, an industrial robot includes a traveling body transported in a direction parallel to the axis of a spindle provided on a lathe, a column provided on the traveling body for being extended and retracted in a vertical direction, a first rotating mechanism provided on the column for rotation about an axis parallel to the spindle axis, and a second rotating mechanism provided on the rotary shaft of the first rotating mechanism and having a hand. The hand, having a double-hand configuration, is swung by the first rotating mechanism in a plane orthogonal to the spindle axis, and is swiveled by the second rotating mechanism about the longitudinal axis of the second rotating mechanism. According to such construction, the fingers of the robot hand can be transported along two sides of the lathe with the minimum number of articulations, and the space required for installation of the industrial robot is much less than that required by the conventional robots of the type that operate in polar or cylindrical coordinate systems. In addition, since the hand possessed by the robot of the present invention is capable of making closer turns in comparison with prior-art robots, robot motion may take place at higher speeds.

As many apparently widely different embodiments of the present invention can be made without departing from the spirit and scope thereof, it is to be understood that the invention is not limited to the specific embodiments thereof except as defined in the appended claims.

What we claim is:

1. An industrial robot mounted on a lathe having a spindle and a chuck for holding a workpiece to be machined by the lathe, comprising:
    a traveling body transportable, from a position where it confronts the chuck, in either direction along an axis parallel to a longitudinal axis of the spindle;
    a column, mounted on said traveling body, said column extending and retracting along an axis orthogonal to the axis traversed by said traveling body;
    a first rotating mechanism mounted on a distal end of said column, having a rotary shaft, said first rotating mechanism for rotating the rotary shaft about an axis parallel to the axis of the spindle;
    a second rotating mechanism mounted on the rotary shaft of said first rotating mechanism, for rotating the rotary shaft about an axis orthogonal to said axis parallel to the axis of the spindle, including an output shaft having a distal end and an extending and retracting member provided on the distal end of the output shaft for changing the length of the output shaft; and
    means for gripping a workpiece machined by the lathe and for gripping a workpiece to be machined, mounted on said distal end of the output shaft, and being rotatable by said first rotating mechanism in a plane orthogonal to the axis of the spindle and rotatable by said second rotating mechanism about the longitudinal axis of the output shaft.

2. An industrial robot for mounting on a lathe having a spindle, comprising:
    a moving mechanism mounted on the lathe having a transporting member transportable along a first axis substantially parallel to the axis of the spindle;
    an extending and retracting member, positioned on the transporting member, extendable and retractable along a second axis substantially orthogonal to the first axis;
    a first rotating member, mounted on the extending and retracting member, having a rotary shaft and being rotatable about a third axis substantially parallel to the first axis;
    a second rotating member driven by the rotary shaft of the first rotating member for rotating the rotary shaft about an axis orthogonal to the axis of the spindle, the second rotating member having a distal end and including an output shaft and a semi-fixed extending and retracting member for changing the length of the output shaft; and
    means, mounted on the distal end of, and rotatable by, the output shaft of the second rotating member, for holding a tool or a workpiece.

3. An industrial robot according to claim 2, wherein said holding means comprises a double hand having two pairs of fingers.

4. An industrial robot according to claim 2, wherein the moving mechanism includes
    a ball nut mounted on the traveling member;
    a motor mounted on the moving mechanism;
    a screw rod extending along the first axis, rotatably mounted on the moving mechanism, driven by said motor and threadably engaged with the ball nut so that rotation of the screw rod moves the ball nut and the traveling member along the first axis.

5. An industrial robot according to claim 2, wherein the extending and retracting member includes:
    a connecting member connecting the traveling member and the extending and retracting member;
    a motor mounted on the connecting member;
    a screw rod extending along the second axis, rotatably driven by said motor;
    a column; and
    a ball nut mounted on the column, the ball nut being threadably engaged with the screw rod so that rotation of the screw rod moves the ball nut and the column along the second axis.

6. An industrial robot according to claim 2, wherein said holding means includes:
    a double-acting cylinder having a single rod; and
    a pair of fingers connected to the single rod of the double acting cylinder.

7. An industrial robot according to claim 2, wherein said holding means includes:
    an endless chain;
    a double acting cylinder connected to drive the chain; and
    a pair of fingers connected to the chain.

* * * * *

UNITED STATES PATENT AND TRADEMARK OFFICE
CERTIFICATE OF CORRECTION

PATENT NO. :   4,628,778

DATED      :   December 16, 1986

INVENTOR(S) :  Nakashima et al.

It is certified that error appears in the above-identified patent and that said Letters Patent is hereby corrected as shown below:

Col. 2, line 66, "graps." should be --grasp.--.

Col. 6, line 35, "includes" should be --includes:--.

Signed and Sealed this

Twenty-first Day of April, 1987

Attest:

DONALD J. QUIGG

*Attesting Officer*        *Commissioner of Patents and Trademarks*